United States Patent [19]

Gaddy

[11] Patent Number: 4,561,283

[45] Date of Patent: Dec. 31, 1985

[54] OFF-SET BOTTOM BAKERY PAN RENOVATION PROCESS

[76] Inventor: William L. Gaddy, 300 Woodhollow Ct., Wylie, Tex. 75098

[21] Appl. No.: 529,608

[22] Filed: Sep. 6, 1983

[51] Int. Cl.⁴ .............................................. B21D 17/02
[52] U.S. Cl. ........................................ 72/414; 72/347; 72/353; 72/465
[58] Field of Search ................................... 72/347–349, 72/414, 466, 465, 352, 354, 356, 353

[56] References Cited

U.S. PATENT DOCUMENTS

| | | | |
|---|---|---|---|
| 2,748,735 | 6/1956 | Slaten | 72/414 |
| 2,980,046 | 4/1961 | McGregor | 72/414 |
| 3,111,100 | 11/1963 | Georgeff | 72/414 |
| 3,258,948 | 7/1966 | Carlson | 72/465 |
| 4,328,696 | 5/1982 | Gonwa | 72/466 |

*Primary Examiner*—Leon Gilden
*Attorney, Agent, or Firm*—Paul D. Gaddy

[57] ABSTRACT

This invention provides a process to renovate the bottoms of bakery pans, and to improve the expected useful life of such renovated pans. The process consists of using a bottom receiving die (female die), and a forming top (male) die, and a high pressure press capable of exerting enough force to stretch the bottom of the bakery pan and causing a rigid indented seam to be formed along the bottom edges of such bakery pans. Due to the extreme environmental conditions bakery pans are exposed to, the bottom portions and bottom edges of the pans become dented and deformed. Such deformity causes higher scrap rates for bread that is manufactured in the baking process. By using the Gaddy Off-Set Bottom process, life expectancy of baking pans are extended considerably, and scrap rates for deformed bread is significantly reduced. Such process also allows many pans to be straightened that otherwise would have to be scrapped and replaced by new, non-deformed pans.

1 Claim, 8 Drawing Figures (SIDE "A")

(SIDE "B")

(SIDE "B")

OFF-SET BOTTOM BAKERY PAN RENOVATION PROCESS

BACKGROUND

The bread baking industry utilizes metal baking pans to put bread dough into for baking the bread in. The baking process typically consists of using automated conveyor systems to move the pans through the baking process. The bread pans are required to undergo severe handling during this process, under high heat conditions (the pans are moved through baking ovens at over 300° F. in temperature). The break baking process results in dented, deformed bottoms being inflicted on the bottom and bottom edges of such baking pans (herein after referred to simply as pans). With such pans being dented and deformed on the bottom, the bread scrap rate is higher than normal, undented bottoms in pans.

The offset bottom process provides the following advantages in addition to the improved useful life expectancy of such pans:

(1) The offset bottom creates a less sharply defined bottom edge of bread, which will reduce the problem of said bread edges slicing through the plastic bags when attempting to insert the bread into the bags after the baking process.

(2) Offset bottom produces a more rounded edge of bottom portion of bread, which will require less lubricant to be supplied to the pan to allow automated equipment to more easily dump the bread after the baking process.

(3) The offset bottom is more flexible than conventional bottoms of pans, thus can absorb shock better with less further damage to bottoms of pans.

(4) The offset bottom will allow the four corners of the pans to avoid being the primary wear-points on typical pans by elevating such four corners slightly above the conveyor belt system.

(5) Nesting and stacking of pans will be made easier as the four edges that normally incur the damage typically inflict damage to a pan it is placed within during the post bake pan-stacking process.

The Gaddy Offset Bottom process will insure significantly improved life time expectancies of such pans. Also, scrap rates of deformed bread will be improved and thus, higher yield of bread out-put per pan used in the baking process. Heretofore, the pan renovation process consisted of using a top die and a rigid, static bottom die that had only fixed guide rails on the sides and the ends of such bottom die. Also, the top die had a surface area along the bottom portion of such die that conformed with the inside dimensions of the baking pan being straightened. With such rigid die surfaces, many pans could not be straightened because of the severity of the deformity along the bottom and bottom edges of such baking pans.

Accordingly, several objects of my invention are to allow the use of dynamic, moveable guide rails on the bottom dies that allow a pan to be guided down into the surface contact area of the bottom die. Whence, a convex ridge mating with a concave cut out on a male die, forces a stretching of the bottom of the pan and an offset, raised, reformed bottom to be formed on the bottom pan surface area. Further objects and advantages of my invention will become apparent from a consideration of the drawings thereof.

DESCRIPTION OF THE PREFERRED EMBODIMENT

Figure 1:
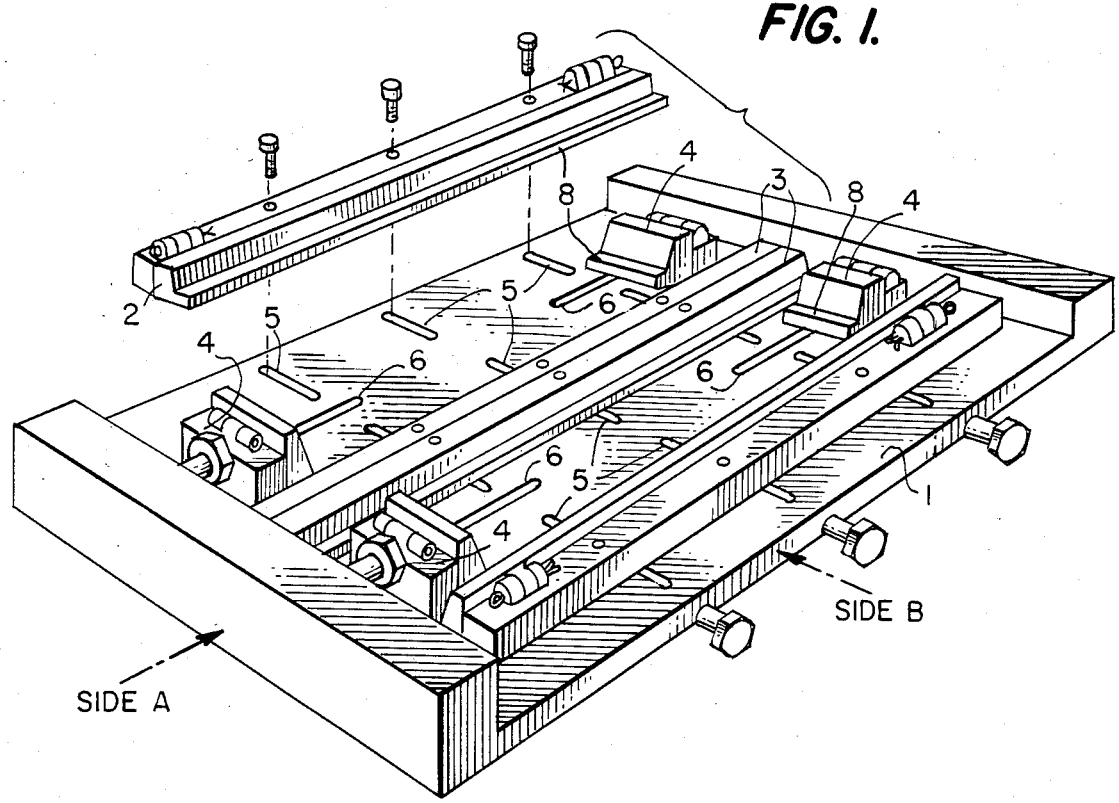
FIG. 1 is a perspective view of the bottom receiving die that the pans are placed into, two at a time.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and further applications of the principles of the invention as illustrated therein being comtemplated as would normally occur to one skilled in the art to which the invention relates.

Referring to FIG., 1, there is illustrated a bottom receiving die. The bottom die shows two outer rail guides, 2, which are used in conjuction with the two inside rail guides, 3, to center a bakery pan for straightening purposes. Further, the end rail guides, 4, align the bakery pan further so that said pan is aligned under the male die, 10, in each of the horizontal and vertical alignments.

The outside rail, 2, in the raised position, shows the nature of the expandability of the dye by way of the slots, which allow positioning the guide rails along an axis that is varying in length, on both bottom and top sides of such die. The end guide rails, 4, are also expandable in design in that slots (cut outs) in plate 1 allow for the end guides to be adjusted toward the center of such plate along an axis that may vary in length. Such slots, 6, allows the end guides to move from a point located near the outside edge of bottom die, 1, to points that extend to areas well within the range of the minimum pan length in current use. These expansion capabilities of the outside and end guide rails thus afford a capability to adjust the receiving die to allow for all the different sizes of bakery pans commonly used in the commercial bread baking environment.

Figure 2:
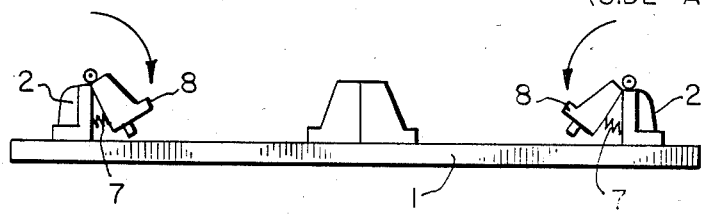
FIG. 2 shows a top looking down perspective of the bottom receiving die.
Figure 6:
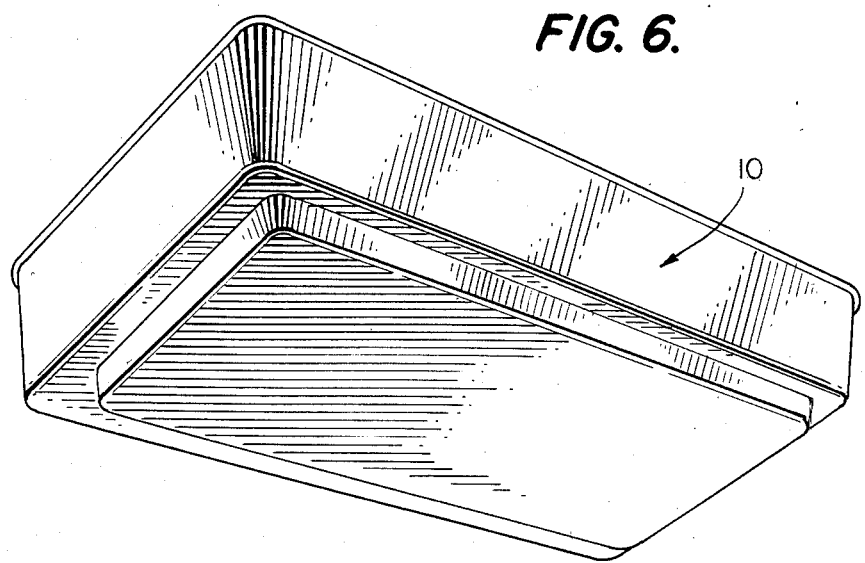
FIG. 6 shows a perspective view of the top, male forming die, which will be forced down into the cavity of the pan and into the respective receiving female die.

Reference FIG. 2. Side rails, 2, shown facing die 1 from a side view, A. This view illustrates the spring-resistance nature of the side rails. Such springs, 7, keep the side rails in a position to assist in seating the bakery pan down into the cavity of the receiving die, thus preventing torn and perforated pans to be further damaged by the straightening process. Such springs, 7, located at two positions near the outside edges of such guide rails, allow the pans to be more easily guided down toward the bottom of the plate, to where the ¼" offset bottom, 8, forces a ridge to be pressed into the bakery pan when male die, 10, FIG. 6, is forced down into the straightening cavity.

Figure 3:
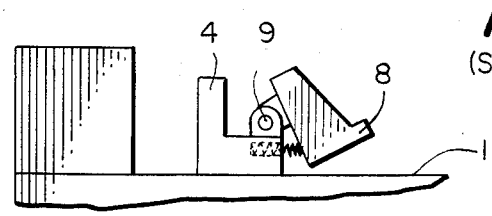
FIG. 3 shows a side view of the bottom plate, showing spring actuated nature of the two outside "guide" rails.

Reference FIG. 3. This view depicts the nature of the end guides, 4, which further act to center such pans in the straightening cavity. The end guides have ridges at the bottom to allow for the offset bottom to be formed when the pan is placed into the receiving die. The spring resistance nature of the end guides allow the pan to be more easily pressed into the straightening cavity. Item 9 shows the hinge mechanism, which is also used on outside guide rails 2, allowing the guides to lower and raise with respective lowering and raising motion of the male die, 10, in FIG. 6.

Figure 4:
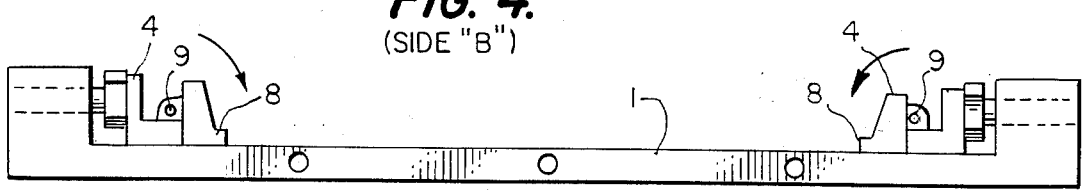
FIG. 4 shows the end spring actuated guide rails.

Reference FIG. 4. This view depicts the end guides in the lowered position, when the male die, 10, FIG. 6, has been lowered into the pan, which has been placed into the straightening cavity. The offset convex ridge on Item 8 in conjunction with the concave surface along the bottom edge of male die, 10, force the offset bottom to be formed on the bottom of said bakery pans.

Figure 5:
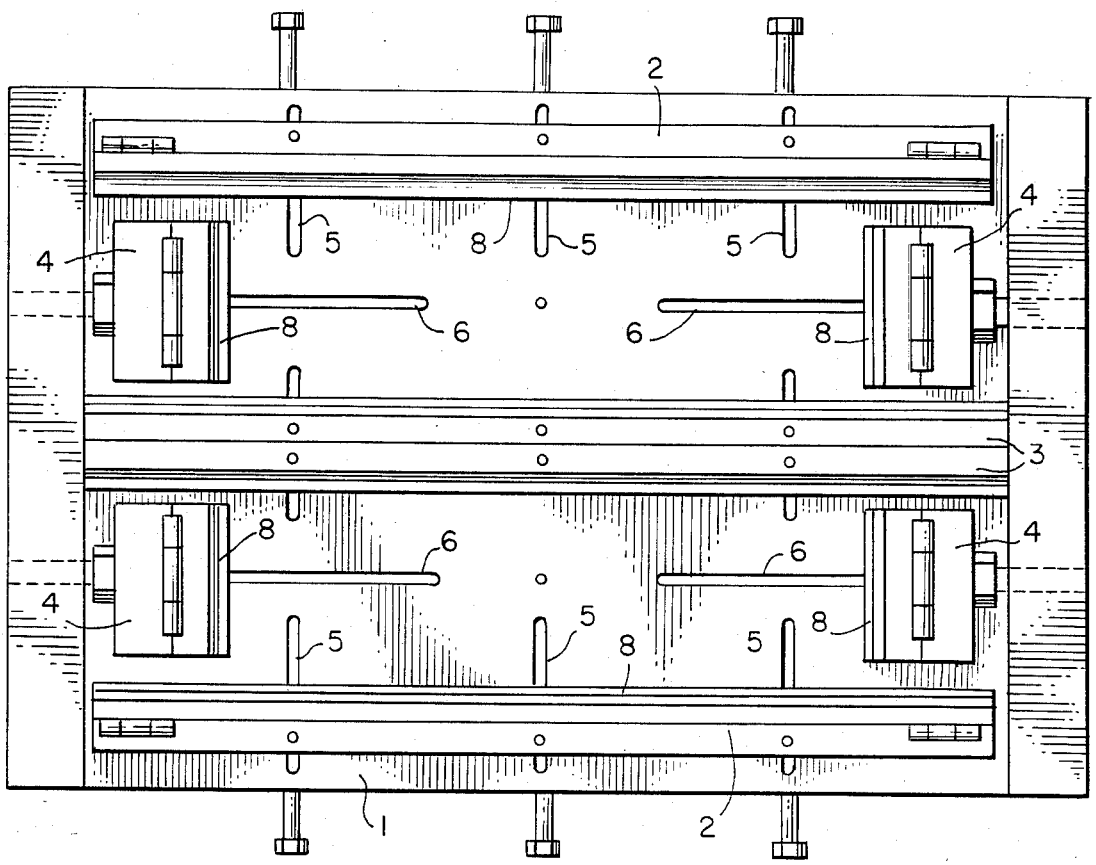
FIG. 5 shows a detail view of the spring actuated end guide rails, in the "open" position, prior to a pan being placed into the receiving die.

Reference FIG. 5. This view depicts the overall expandable nature of the Female die straightening cavity. The two cavities allow for the offset process to be executed on the two pans simultaneously.

Reference FIG. 6. This view shows the top die, and how the use of two such dies when mounted on a Press perpendicular to each other is forced down into the bread pan which has been placed with two straps (two bread forming metal containers held together by metal straps on the outside edge) into the female bottom die. As pressure is supplied from the hydraulic ram, the top die is forced down into the pan, forcing the pan down into the female die straightening cavity. Whence the guide rails in the up or raised position allow the pan to be guided down into the area of the straightening cavity where the ridges on the guide rails will stretch the bottoms of such metal pans.

Figure 7:
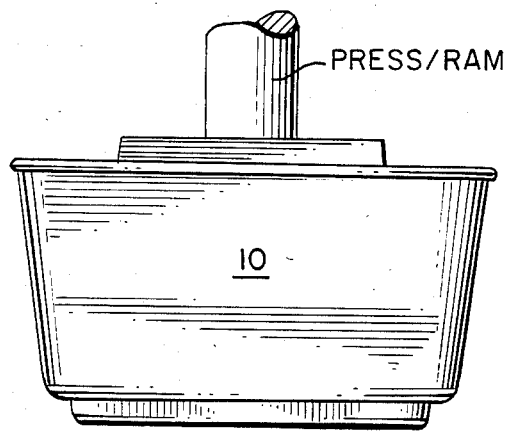
FIG. 7 shows a side view of the top male forming die showing the angular nature of the sides which conform to the pans inside measurements.

Reference FIG. 7. This view depicts the top die attached to the press.

Figure 8:
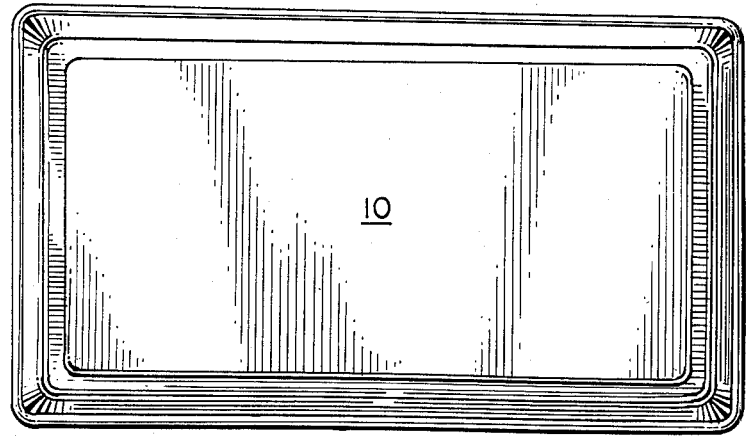
FIG. 8 shows a bottom view of the top die, showing the nature of the "offset" bottom which has a surface allowing for conformity to the ridges which are located on the guide rails in the bottom die.

Reference FIG. 8. This view is from looking straight down onto the bottom of top die.

While the above description contains many specifics, these should not be construed as limitation on the scope of the invention, but rather as an exemplification of one preferred embodiment thereof. Many other variations are possible; for example, the top and bottom dies may have corresponding concave and convex ridges added bi-directional in various configurations to both top and bottom die surfaces in order to take up even more "slack" from deformed metal baking plans. Accordingly, the scope of the invention should be determined not by the embodiment illustrated but by appended claims and their legal equivalents.

I claim:

1. A method of reforming baking pans which comprises:
    (a) using a press containing a relatively movable top male reforming die;
    (b) lowering said die into the cavity of a workpiece to be reformed, said workpiece initially resting on movable upraised guide rails;
    (c) a bottom receiving female die aligned underneath the male die;
    (d) applying necessary pressure from the press to force the male die completely onto the female cavity;
    (e) the movable guide rails reach their lower limit when they contact the female die's bottom surface whereby the movable guide rails become part of the female die's forming surface;
    (f) the necessary force is applied to the male die from the press to form an off-set bottom in the workpiece.

* * * * *